United States Patent [19]

Powell et al.

[11] Patent Number: 5,430,864
[45] Date of Patent: Jul. 4, 1995

[54] EXTENDING COMPUTER ARCHITECTURE FROM 32-BITS TO 64-BITS BY USING THE MOST SIGNIFICANT BIT OF THE STACK POINTER REGISTER TO INDICATE WORD SIZE

[75] Inventors: Michael Powell, Palo Alto; Robert Cmelik, Sunnyvale; Shing Kong, Mountain View; David Ditzel, Los Altos Hills; Edmund Kelly, San Jose, all of Calif.

[73] Assignee: Sun Microsystems, Inc., Mountain View, Calif.

[21] Appl. No.: 321,459

[22] Filed: Oct. 11, 1994

Related U.S. Application Data

[63] Continuation of Ser. No. 146,433, Oct. 29, 1993, which is a continuation of Ser. No. 632,017, Dec. 21, 1990.

[51] Int. Cl.⁶ .............................................. G06F 12/04
[52] U.S. Cl. .................................. 395/500; 395/800; 364/DIG. 1; 364/DIG. 2; 364/255.1; 364/254.9; 364/243; 364/948.1; 364/958.5; 364/970.3
[58] Field of Search .............................. 395/500, 800

[56] References Cited

U.S. PATENT DOCUMENTS

| | | | |
|---|---|---|---|
| 3,735,355 | 5/1973 | Balogh, Jr. et al. | 395/375 |
| 4,361,868 | 11/1982 | Kaplinsky | 395/400 |
| 4,445,173 | 4/1984 | Pilat et al. | 395/375 |
| 4,604,695 | 8/1986 | Widen et al. | 395/400 |
| 4,679,140 | 7/1987 | Gotou et al. | 395/775 |
| 4,852,048 | 7/1989 | Morton | 395/800 |
| 4,868,740 | 9/1989 | Kagimasa | 395/400 |
| 5,023,777 | 6/1991 | Sawamoto | 395/400 |
| 5,129,070 | 7/1992 | Dorotte | 395/400 |

FOREIGN PATENT DOCUMENTS

0148478A2  12/1984  European Pat. Off. .
0230351A2  1/1987  European Pat. Off. .

OTHER PUBLICATIONS

32-Bit µP is a Fine Match For Today's Languages and Operating Systems, author: R. Agarwal, et al.; publication: Electronic Design; vol. No. 33; date: Oct. 31, 1985.
"Advanced 80386 Programming techniques" James L. Turley 1988 Chapters 2 and 5.

*Primary Examiner*—Parshotam S. Lall
*Assistant Examiner*—Timothy L. Philipp
*Attorney, Agent, or Firm*—Blakely, Sokoloff, Taylor & Zafman

[57] ABSTRACT

The present invention enables a computer system to store from register files to memory, and restore from memory back to the register files, data from programs designed to operate in accordance with a first word size, as well as programs designed to operate in accordance with a second word size. This is accomplished without an increase in hardware and without requiring modification of existing software. In particular, an indication is utilized at the procedure level to designate whether a particular procedure is using words of a first or second word size. Preferably, this indication is placed in a first predetermined bit position in the stack pointer of the procedure. When a save occurs, certain contents from the register file are saved to memory along with the stack pointer. Under certain circumstances, the word size indication is moved to a second predetermined bit position within the stack pointer which is stored in a predesignated stack pointer address in the save area. When the contents are restored from memory, back to the register file, the indication is reviewed in the stack pointer address and serves to determine the word size of the procedure being restored.

16 Claims, 3 Drawing Sheets

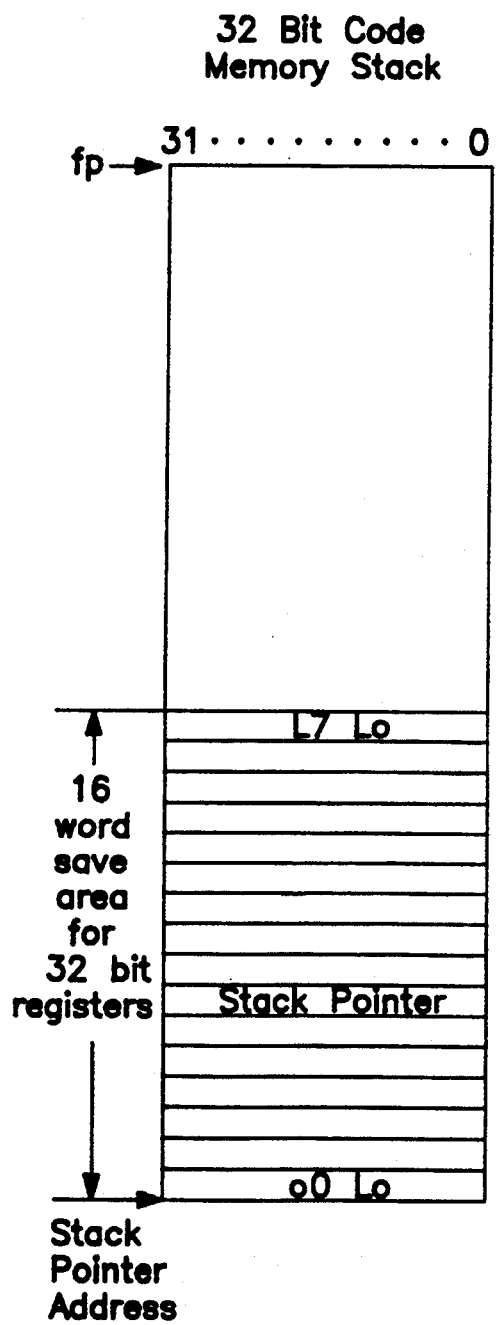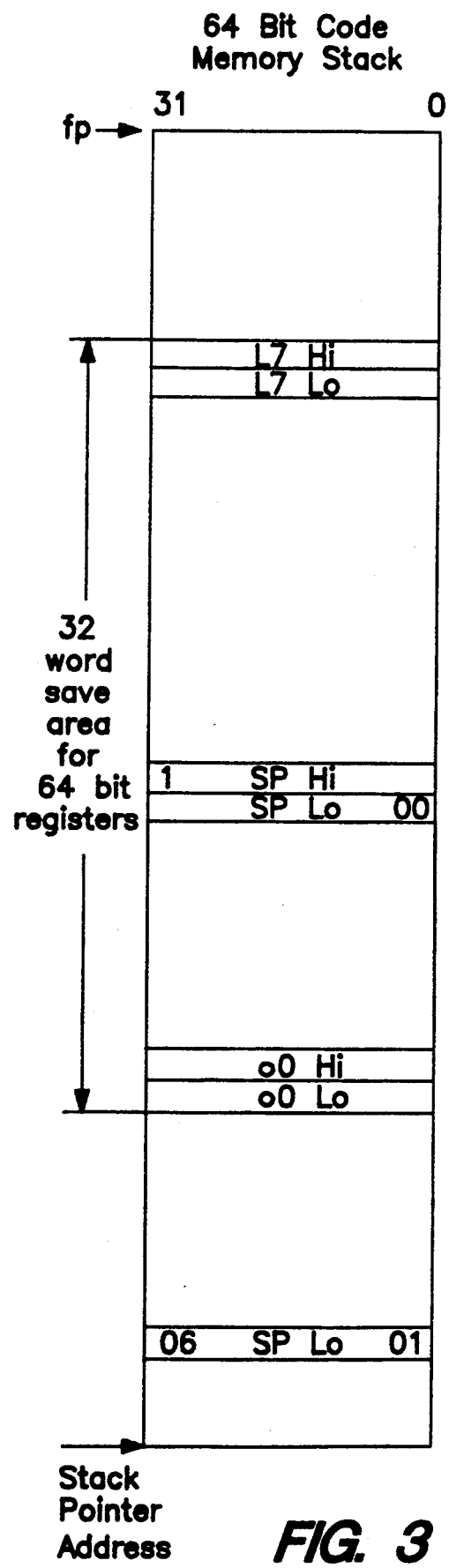
FIG. 2
FIG. 3

EXTENDING COMPUTER ARCHITECTURE FROM 32-BITS TO 64-BITS BY USING THE MOST SIGNIFICANT BIT OF THE STACK POINTER REGISTER TO INDICATE WORD SIZE

This is a continuation of application Ser. No. 08/146,433, filed Oct. 29, 1993, which is a continuation of application Ser. No. 07/632,017, filed Dec. 21, 1990.

BACKGROUND OF THE INVENTION

1. Field of the Invention

This invention relates to computer systems and, more particularly, to methods and apparatus for extending computer architecture from thirty-two to sixty-four bits.

2. History of the Prior Art

As computers have improved in speed and ability, there has been a constant demand for more addressable memory. The size of the address directly controls the size of memory which may be addressed. Each additional bit in an address doubles the amount of addressable memory. Thus, a system using sixty-four bit addresses provides two to the thirty-second power more addresses than does a system using thirty-two bit addresses. Consequently, researchers are today attempting to develop computer systems based on sixty-four bit architectures. On the other hand, very powerful computers exist today which use thirty-two bit addresses. A very large amount of very effective software exists for such systems. Most companies have more invested in their computer software than they do in their hardware. These thirty-two bit systems could effectively handle larger and larger problems if there were an easy way to simply address more memory. Presuming that the only effective way to obtain more memory is to design systems using larger (sixty-four bit) addresses, it would be very foolish and economically disastrous to simply discard all of the effort presently invested in the design of thirty-two bit systems and their software. For this reason, it is an a priori requirement that any new computer system based on a new memory size must be able to use the old programs on the new architecture. A primary question in the design of such a system is, therefore, how to change memory address size and still be able to use the old programs on the new architecture.

Two different tacks have been taken in resolving this problem so that a new system can run both old and new programs. One way to do this is to essentially provide two different architectures within the same machine for handling programs based on the different memory sizes and give the machine the ability to select one or the other architecture. This allows a machine to implement two different instruction sets. This is generally referred to as mode selection. One problem with this solution is that the need for two independent architectures must be perpetuated with each new series of machines; the manufacturer must continue to build systems including both thirty-two and sixty-four bit architectures for so long as the thirty-two bit programs are to be used. Another problem with this solution is that old and new procedures cannot communicate easily since they operate on different portions of the system. Digital Equipment Company (DEC) attempted this type of solution in changing from its PDP11 series of computers to its VAX series of computers. DEC set up microcode for operating both the PDP11 and the VAX instruction sets in its new VAX computers and used a mode switch which allowed selection between the two instruction sets in the machine.

A second solution to the problem is to design the new system so that the same hardware is able to handle both old and new processes using the same circuitry. This is a much more desirable solution. However, the prior art attempts to reach this solution have not, in fact, accomplished their purpose of eliminating hardware directed specifically to the different architectures. For example, Intel has followed this path in designing and improving its $80 \times 86$ line of computers. In general, Intel has continued the memory-handling hardware mechanisms for programs based on the old architecture and has added additional memory-handling hardware for programs based on the new architecture. The commands available to the old programs are essentially a subset of the entire set of commands available in the new machine. Although this solution allows the use of both old and new software by the same processor, it has provided no easy way to utilize old and new processes together. This method has also required the inclusion of the additional memory-handling hardware with each more advanced step, often to the detriment of the more advanced architecture. For example, the advanced Intel processors are still unable to deal with the larger address space except through the use of memory mapping hardware provided in the older machines.

Thus, there have been at least two different solutions to the problem. Each solution has not resolved the problem in a manner in which the new system is simply able to run either old or new programs using the new address space apparently without any great amount of new hardware except that necessary to allow the larger addresses to be utilized and without any rewriting of old software to fit the new hardware.

One especially difficult problem associated with providing such a system is caused by the manner in which an older system maintains its register files and stores the contents of those registers to memory and restores those contents during certain operations. Since a new system using a memory address size twice as large as an old system must necessarily use different space than the old system to store this information, some way must be found to allow the system to handle information for programs of both sizes correctly.

SUMMARY OF THE INVENTION

It is, therefore, an object of the present invention to provide a method and apparatus for allowing a computer system to run existing programs having a thirty-two bit word size and new programs having a sixty-four bit word size.

It is another more specific object of the present invention to provide a method and apparatus for allowing a computer system to store from register files and restore to register files from memory both existing programs having a thirty-two bit word size and new programs having a sixty-four bit word size without any substantial increase in hardware and without requiring a modification of the existing thirty-two bit software.

It is yet another more specific object of the present invention to provide a method and apparatus for allowing a computer system to save and restore state in response to the existence of traps for both existing programs having a thirty-two bit word size and new programs having a sixty-four bit word size.

These and other objects of the present invention are realized in a method for running computer programs of different word sizes on a processor having registers designed to run procedures of a largest one of the word sizes comprising the steps of placing an indication in at least one of a number of the registers of the processor designating the word size of the procedure, providing save areas in memory for the register files of each of the word sizes, all of the save areas including at least one portion at the same address, that portion being a portion of the save area of the procedure of a smallest one of the word sizes, placing the indication held in at least one of a number of the registers of the processor designating the word size of the procedure in the portion of the save areas having the same address each time a save operation occurs, and reviewing the indication in the portion of the save areas having the same address each time a restore operation occurs to determine the size of words in the procedure being restored.

These and other objects and features of the invention will be better understood by reference to the detailed description which follows taken together with the drawings in which like elements are referred to by like designations throughout the several views.

BRIEF DESCRIPTION OF THE DRAWINGS

FIG. 2 is an illustration of a region of memory used for saving a register file in a thirty-two bit architecture.

FIG. 3 is an illustration of a region of memory used for saving a register file in a sixty-four bit architecture.

NOTATION AND NOMENCLATURE

Figure 1:
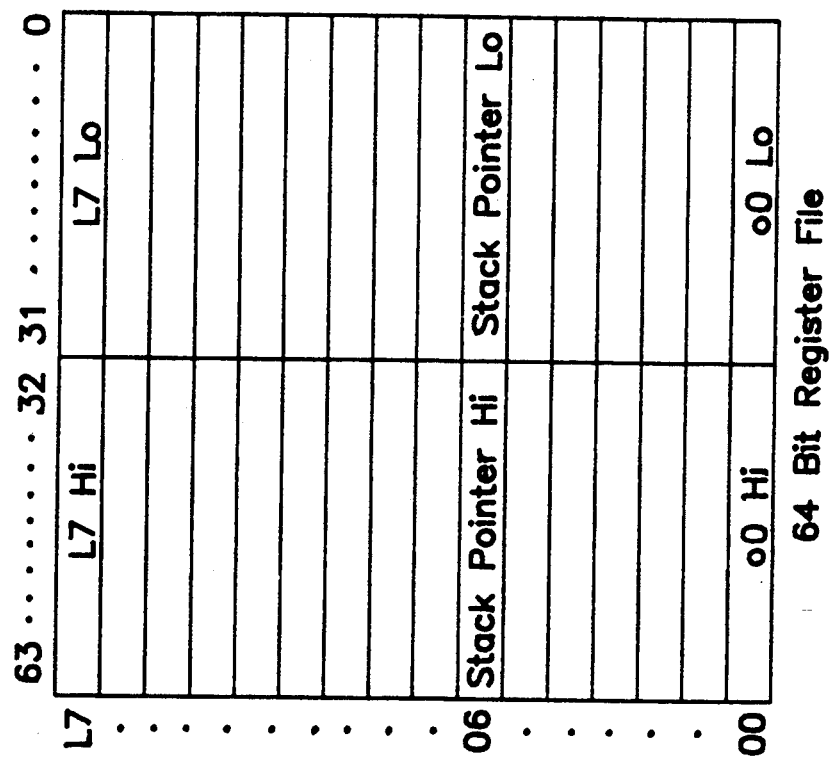
FIG. 1 illustrates register files utilized in the thirty-two bit SPARC architecture and in the sixty-four bit architecture designed to replace the thirty-two bit architecture.
Figure 1:
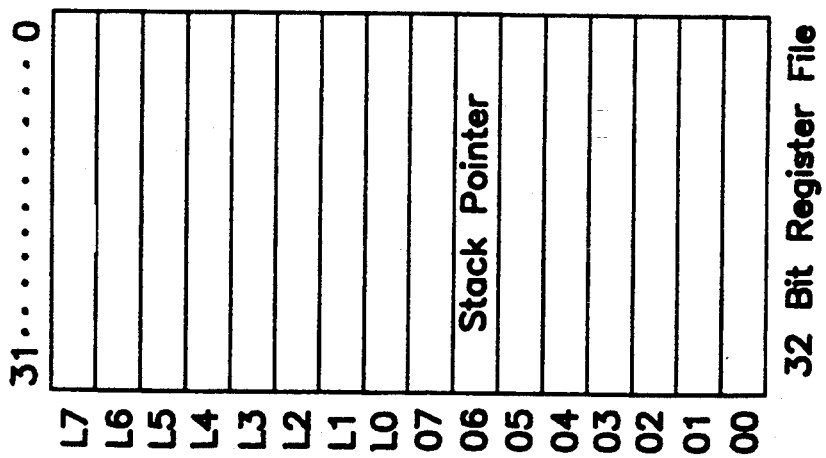

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Although the problem of changing a system from one which handles thirty-two bit addresses to one that handles sixty-four bit addresses seems simple, just change the size of the registers, it is in reality much more complicated because of the hardware and the software already in existence. The reasons for this complication may be better understood by referring to FIG. 1 which illustrates register files utilized in thirty-two bit SPARC architecture and in sixty-four bit architecture designed to replace the thirty-two bit architecture. Machines using the SPARC architecture are designed, manufactured, and sold by Sun Microsystems, Inc., Mountain View, Calif. On the left are shown sixteen individual registers each capable of storing thirty-two bits of binary information as one and zero states. The bit positions within the individual registers are indicated at the top of the thirty-two bit register file. It should be noted that in the SPARC format the seventh register from the bottom is by convention referred to as the stack pointer, for it contains the stack address to which a portion of the register file is to be stored in memory in case of an interrupt.

The sixty-four bit register file shown to the right is similarly arranged, and contains sixteen individual registers each, however, capable of holding sixty-four bits of binary information. The bit positions for the registers are indicated at the top of the sixty-four bit register file. The words stored in the sixty-four bit registers conform in all important respects to the words used in thirty-two bit SPARC architecture.

Those skilled in the art will understand that, in general, the data contained in thirty-two bit registers can be placed and used in sixty-four bit registers without affecting the results. This occurs because most architectures utilize two's complement arithmetic which, in general, overflows to the left. And the thirty-two bits used for commands in a thirty-two bit architecture can certainly be placed in the register space provided by a sixty-four bit architecture.

However, in running software under most architectures, it is continually necessary to switch from one procedure to another or from one program to another. Whenever there is an insufficient number of registers in the processor to handle a new procedure, the contents of at least some of the registers must be saved to memory so that the space they occupy may be used by the new procedure. Generally, whenever a program is operating and the system must stop a particular procedure and transfer to another procedure, it is necessary for the state of the present procedure (the information held in the register file regarding and being used by that procedure) to be saved for use upon return to the procedure. Then the registers must be restored for the new procedure, the new procedure must be run, the state from the old procedure retrieved and placed in the registers, and the old procedure restarted. This is true of most architectures no matter what format they run in.

The SPARC architecture, unlike many architectures, has a register file which contains many register windows in its integer processor. Each register window includes sixteen registers, eight of which are called LOCAL registers and eight of which are called IN registers. At least two register windows exist in any implementation of the SPARC architecture. The IN registers of one register window function as the OUT registers of the immediately preceding window so that the register windows may be thought to form a large ring. By switching from one window to the adjacent window when a program changes from one procedure to the next, the processor may run a number of procedures without having to save to memory the registers of a procedure which has been left and later having to restore the registers of that procedure from memory. This speeds the operation of the processor.

However, even a SPARC processor has a limited number of register windows; and, when that limit it reached, the registers of the next window in the ring must be saved to memory. In order to accomplish this, the SPARC architecture uses a window pointer. When the window pointer indicates that the register file is out of register windows and a new window is required, an overflow trap is generated which signifies that the contents of the registers in the next register window must be saved to memory. When this procedure being saved is to be run again, its register contents must be restored from memory. In a similar manner, when a procedure which has been saved is restored to a register window, that register window probably contains a procedure which must be saved before the procedure being restored may be placed in the registers of the window. To accomplish this, the window pointer is used to generate an underflow trap.

Thus, it may be seen that in both conventional architectures and SPARC architecture, a time ultimately comes when register files must be first saved to memory and then restored to the register file.

In order to save the state of a procedure in response to an overflow or underflow trap, a thirty-two bit SPARC architecture machine takes thirty-two bits from each of the registers of its current register window in the integer processor register file and stores that information in thirty-two bit save space in memory (on the "stack"). The hardware and the programs are adapted to cause this to happen. The system uses an address stored in the stack pointer register and places the information stored in the registers of the register file at addresses in memory beginning at that stack pointer address. Thus, the hardware and software combine to produce a particular amount of thirty-two bit save space for storing register state on the occurrence of the trap. This is, in general, the way any system based on a thirty-two bit architecture operates.

Such a thirty-two bit save space for a SPARC machine is illustrated in FIG. 2. As is shown, the save space includes sixteen thirty-two bit words starting at the stack pointer address. It will be noted that additional space exists above the register file storage area in the save space for other purposes. It will also be noted that the address held in the stack pointer register of the register file illustrated in FIG. 1 is stored in the seventh word space in the save space in memory. When the procedure is ready to restart, the data in the save area is returned to the register file used with the processor so that it may be utilized.

In order to operate with thirty-two bit procedures, the architecture of any new system must adhere to the conventions used by that code. Consequently, any new system must be able to save thirty-two bit information from an old procedure held in a register file to a thirty-two bit save area just as did the old architecture. It must also be able to retrieve that information and replace it correctly in the register file.

It will be noted that the save space in memory provided for thirty-two bit procedures is not arranged to handle sixty-four bit words. Yet it is necessary that the system store the longer words somewhere. Various arrangements for placing the sixty-four bit registers used by the new architecture can be visualized. For example, it would be possible to halve the sixty-four bit words and store the halves including the high bits above the low bits in adjacent word spaces in the save space starting at the stack pointer address. However, when the system looked for saved data from which to restore the registers, the data would be in different positions in the thirty-two and sixty-four bit formats. If the system retrieved data expecting it to be thirty-two bit data and it were sixty-four bit data (or vice versa), the system could not operate correctly.

Thus it seems clear that even were there an arrangement to provide sufficient space to store sixty-four bit words, the system would have to understand whether that information was sixty-four bit information or thirty-two bit information in order to function properly. And even if the information were to be appropriately stored, the system must know how to restore the information when required.

This poses a number of questions. First, how does the system know whether the information in a register file is thirty-two or sixty-four bit information? Second, even if the system knows information is in a particular format, what do the bits mean? For example, the upper bits held in a register may be meaningless if the procedure is a thirty-two bit procedure, or they may be necessary information if the procedure is a sixty-four bit procedure. If the machine restores sixty-four bits to the registers and uses meaningless bits in a thirty-two bit procedure, the procedure is in great difficulty.

This problem is difficult where the registers and the storage are fixed in hardware. However, where the registers and the save space are delineated by software, the problem is much greater. For example, the conventions used in defining the operation of a particular system (such as the SPARC architecture) define save regions for the programs or procedures operating on the particular system. Each procedure sets up a register stack in this manner. It sets up a stack pointer which points to a register save area. The register save area and the position of the stack pointer cannot vary or the old programs will not work. Since the old procedures define the arrangement, all of the old procedures adapted to run on thirty-two bit machines would have to be changed in order to function correctly and know what to do with the information. It is simply impossible to correctly fix (translate) all of the old programs. Consequently, the changes made in changing the system to include sixty-four bit architecture must be those which can be made to the new system software to allow it to run with both the old and the new programs without the necessity of varying those programs.

The present invention solves the problem of storing and restoring both thirty-two and sixty-four bit information without any substantial increase in hardware and without requiring a modification of the existing thirty-two bit software. The present invention utilizes an indication at the procedure level to signal whether the procedure is a thirty-two or a sixty-four bit procedure. In order to accomplish this, the stack pointer is used to store the indication; this is a convenient place for the indication because the system must look to the stack pointer to find the address of the save space. On a trap requiring a register file save, the indication is looked at to determine whether the state is to be stored in thirty-two bit save space or sixty-four bit save space. In this manner, the save space for old procedures may utilize the same area of memory as would have been used under the old system software. Additional space may then be provided to store the registers of a sixty-four bit procedure.

FIG. 1 illustrates how this may be accomplished in a system using the SPARC architecture. As is illustrated in FIG. 1, the sixty-four bit registers contain the values of the thirty-two bit registers in the low order bits. Since each thirty-two bit procedure used in the SPARC architecture includes in the stack pointer register a stack pointer which indicates among other things the address in memory at which registers for this procedure are to be saved, the stack pointer register will always include this stack address. In order to indicate that the words of the particular procedure held in the registers are thirty-two or sixty-four bit words, bit 63 (the most significant bit) of the stack pointer is used. If the procedure is a thirty-two bit procedure, a zero is placed in this bit position. If the procedure is a sixty-four bit procedure, a one is placed in this bit position. In the SPARC architecture, the trap handler procedure (or hardware) is involved when an overflow trap indicates that the registers of a procedure presently running are to be saved. Whether done in hardware or software, the trap handler can see this bit in the stack pointer and act on it to save the registers in accordance with the particular procedure type.

It is important that this bit be used rather than some other bit. The stack pointer contains the address at which the save area is to be found. Since this address may be manipulated mathematically in addressing, the use of the highest order bit allows the stack pointer address to be added to or subtracted from without affecting the indication of the type of procedure held in bit 63. Since bit 63 is the most significant bit, it would not be expected to change at the low levels of addition or subtraction to be expected in address manipulations on the stack pointer.

It will be realized that since the SPARC architecture and almost all other architectures use two's complement arithmetic, the low order bits of the results of arithmetic operations do not depend on the high order bits of the operand; this allows arithmetic to be accomplished on the addresses in the stack pointer whether those addresses are in thirty-two bit or sixty-four bit code.

The arrangement described allows the system to know the format of the data used by the procedure when a save operation is needed. In response to this indication, the system may place the information in the registers for a thirty-two bit procedure in the save space illustrated in FIG. 2. However, as discussed above, this space is not organized for the register information of a sixty-four bit procedure. Consequently, sixty-four bit functions or procedures define a new save area. That save area is illustrated in FIG. 3. The area commences at the same stack pointer address and preempts the same register space as does the thirty-two bit area. However, the only information stored in this space is the lower order thirty-two bits of the stack pointer address; the other register save positions are left empty. Then beginning at the first position above the thirty-two bit save area, a completely new sixty-four bit save area is defined. In the preferred embodiment of the invention which is used in a SPARC architecture, the data from each register is stored in two thirty-two bit words adjacent one another, the low bits being stored below the high bits. A total of thirty-two word spaces, each of thirty-two bits, is thus available to store the register file for a sixty-four bit procedure.

It should be noted that the stack pointer is stored in unmodified form again in this sixty-four bit save area. The reason for this will become apparent from the following description.

In order to indicate that a saved procedure is either a thirty-two or a sixty-four bit procedure upon a restore, the indication is moved to the low thirty-two bits so that only the thirty-two bit save area need be searched. The bit indicates to the machine whether only the lower thirty-two bits of the state in a thirty-two bit procedure are to be used when restored or that sixty-four bits of the state in a sixty-four bit procedure are to be used when restored.

As explained above, the indication placed in the stack pointer register o6 is sufficient to indicate to the system whether the procedure being run in the register file is a thirty-two bit or a sixty-four bit procedure. However, the state stored in the save area must also be restored in order that it may be reused. There must be some way for the system to determine when it looks at the save area whether this is a thirty-two bit or sixty-four bit procedure. Since one of the requirements of the new design is that the thirty-two bit save area format not be changed, looking at the information in bit 63 of the stack pointer for a thirty-two bit procedure will tell nothing since this bit does not exist in the save area for such a thirty-two bit procedure.

Thus, there must be some way to determine from the lower thirty-two bits of the stack pointer the type of procedure which is involved. Fortunately, the values for stack pointer addresses are aligned on four byte boundaries in the SPARC architecture and other architectures as well. Thus the stack pointer register holds an address which includes a zero as its lowest order bit. Use of this bit to record the format indication stored in the stack pointer register at the high order bit allows the indication to be transferred to the thirty-two bit save area when the state of the registers is saved in both thirty-two bit and sixty-four bit save areas of memory. The state of the bit in the 63 bit position is therefore moved into the lowest order bit when the state of the register file is saved. In this manner, only the stack pointer of the thirty-two bit save area need be searched.

An underflow trap is used to restore the save area of memory. The underflow trap need simply look at the lowest order bit of the stack pointer to determine whether a thirty-two or sixty-four procedure is stored in the save area This tells the system the particular type of procedure being used. In the preferred embodiment, a zero is used to indicate a thirty-two bit procedure. Since thirty-two bit procedures already in use are not to be changed and a zero is normally found in the lowest order bit, this leaves the thirty-two bit procedure save area unaltered. On the other hand, a one in the lowest order bit is used to indicate a sixty-four bit procedure. Because a copy of the lower thirty-two bits of the sixty-four bit stack pointer (actually only the lowest order bit is necessary) is stored in the usual position for a thirty-two bit stack pointer, the sixty-four bit procedure responds to the same underflow trap without any change to the procedure other than the response to restore from different save positions once a sixty-four bit procedure has been detected by the trap.

Since the information in the stack pointer must be used by the procedure, if the procedure is a sixty-four bit procedure, the system leaves the stack pointer in the upper area in its original condition with a one in the lowest bit position so that no time is lost when the register file is restored. As is also illustrated in FIG. 3, the one remains in bit position 63 designating a sixty-four bit procedure even though the lowest order bit of the stack pointer in the thirty-two bit save area provides the same information while the register file is stored in the save area.

It should be noted that one problem which exists with the use of the same sixty-four bit registers for both thirty-two and sixty-four bit procedures is that a register file executing a thirty-two bit procedure may include a number of higher order bits which are not related to the procedure. In some cases these bits can adversely affect the outcome of the procedure being run. For example, if the register contains an address to be used in a load or a store operation for a thirty-two bit procedure, if the upper bits are used, they produce the wrong address. Consequently, these bits must be masked off in some manner. In the preferred embodiment of the present invention, a mask register is used to store information relating to the particular bits of the address which are to be used. When data is loaded or stored using an address held in the register file, the mask register is used to force the state of the upper bits which would otherwise carry invalid information. The details of such a mask register are described in more detail in U.S. Pat. No. 5,210,839, entitled METHOD AND APPARATUS FOR PROVIDING A MEMORY ADDRESS FROM A COMPUTER INSTRUCTION USING A MASK REGISTER, Powell et al, filed on even date herewith and assigned to the assignee of the present invention.

Figure 4A:
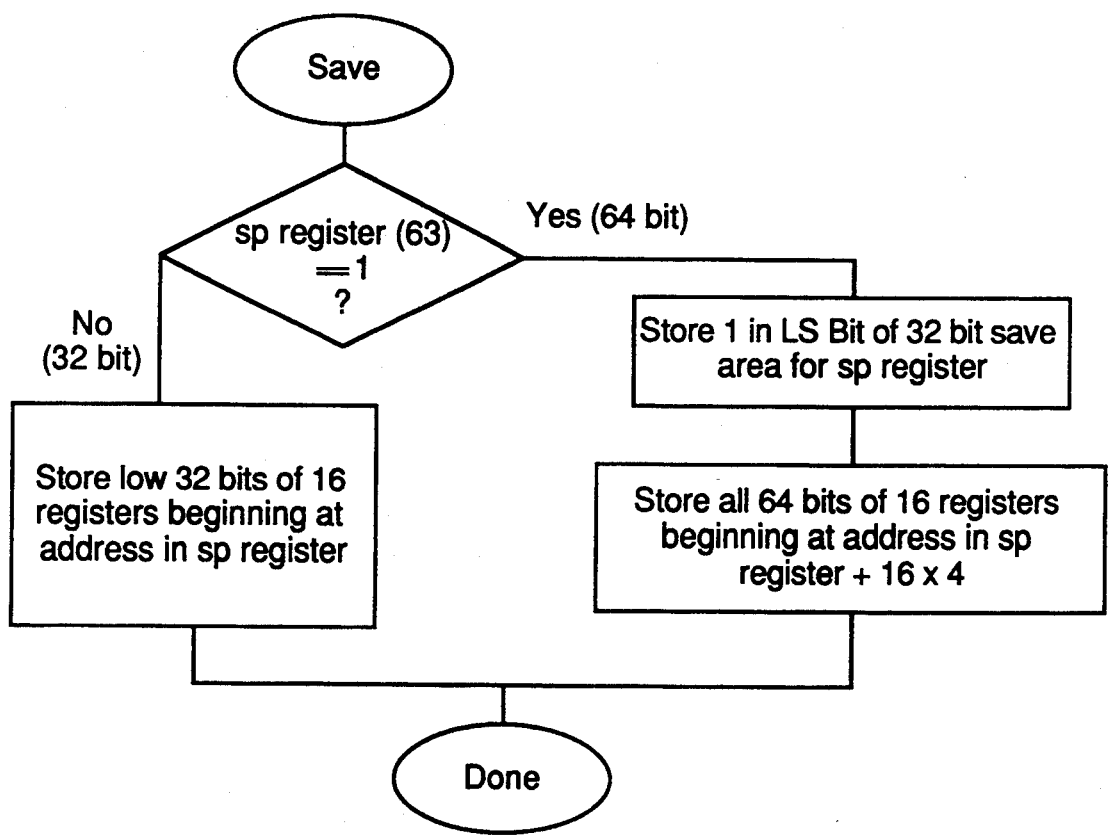
FIGS. 4a and 4b are an illustration of the steps used in practicing the method of this invention.
Figure 4B:
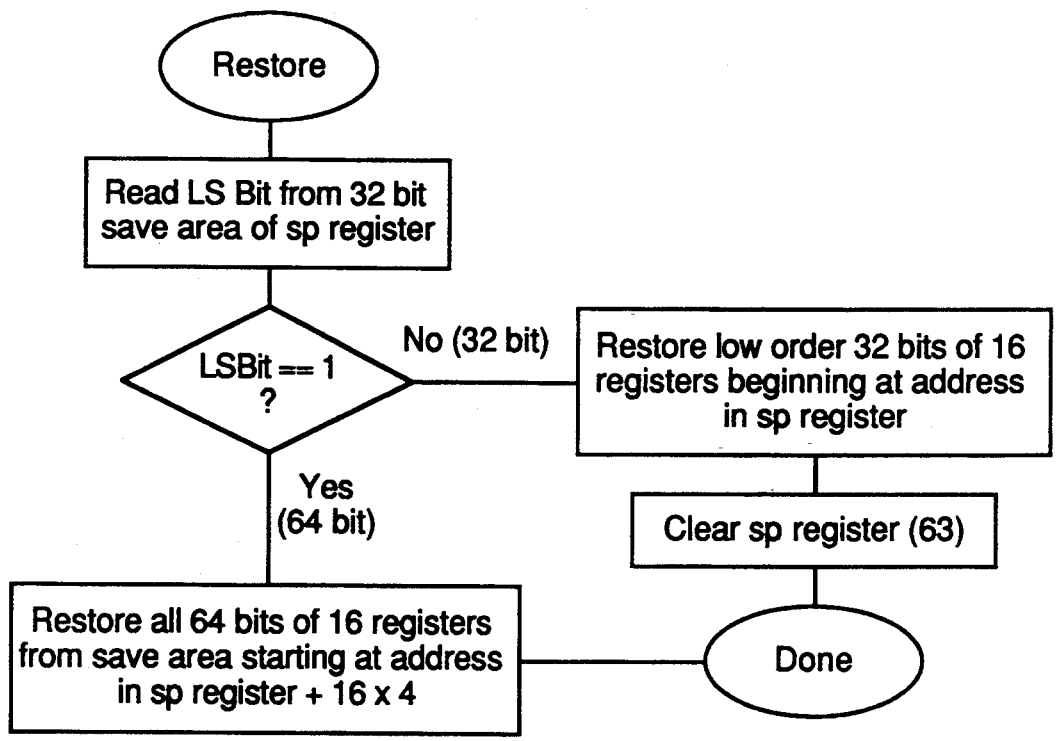

FIGS. 4a and 4b illustrate and reiterate the steps used in practicing the method of this invention.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for context switching a processor that executes procedures having differing word sizes, comprising the steps of:
   testing a most significant bit of a stack pointer register in the processor that indicates whether a set of data values for a procedure that are stored in a set of registers in the processor each have a first word size or a second word size wherein the first word size is less than the second word size;
   transferring the data values from a least significant portion of each register to a first stack save area in memory and transferring a least significant portion of a stack pointer value from the stack pointer register to the first stack save area in memory if the most significant bit of the stack pointer register indicates the first word size;
   setting a width indication bit in the first stack save area in memory, and transferring the data values from the registers to a second stack save area in memory and transferring the stack pointer value from the stack pointer register to the second stack save area if the most significant bit of the stack pointer register indicates the second word size such that the width indication bit in the first stack save area in memory indicates that the data values for the procedure have the second word size.

2. The method of claim 1, further comprising the steps of:
   testing the width indication bit in the first stack save area in memory;
   reading the data values and the least significant portion of the stack pointer value from the first stack save area, and storing the data values into the least significant portions of the registers and storing the least significant portion of the stack pointer value into the stack pointer register, and clearing the most significant bit of the stack pointer register to indicate that the data values for the procedure have the first word size if the width indication bit in the first stack save area in memory does not indicate that the data values for the procedure have the second word size;
   reading the data values and the stack pointer value from the second stack save area, and storing the data values into the registers and storing the stack pointer value in the stack pointer register if the width indication bit in the first stack save area in memory indicates that the data values for the procedure have the second word size.

3. The method of claim 2, wherein the width indication bit in the first stack save area comprises a least significant bit in a location of the first stack save area allocated to the stack pointer value for the procedure.

4. The method of claim 2, wherein the first stack save area is specified by the stack pointer value in the stack pointer register.

5. The method of claim 4, wherein the second stack save area is specified by the stack pointer value in the stack pointer register plus an offset value that corresponds to an area in memory required for the first stack save area.

6. The method of claim 5, wherein the first word size comprises 32 bits and the second word size comprises 64 bits.

7. The method of claim 6, wherein the registers in the processor and the stack pointer register in the processor comprise 16 registers each comprising 64 bits.

8. The method of claim 7, wherein the offset value and the area in memory for the first stack save area each comprise 16 multiplied by 4 bytes per register.

9. A processor that executes procedures having differing word sizes, comprising:
   means for testing a most significant bit of a stack pointer register in the processor that indicates whether a set of data values for a procedure that are stored in a set of registers in the processor each have a first word size or a second word size wherein the first word size is less than the second word size;
   means for transferring the data values from a least significant portion of each register to a first stack save area in memory and transferring a least significant portion of a stack pointer value from the stack pointer register to the first stack save area in memory if the most significant bit of the stack pointer register indicates the first word size;

means for setting a width indication bit in the first stack save area in memory, and transferring the data values from the registers to a second stack save area in memory and transferring the stack pointer value from the stack pointer register to the second stack save area if the most significant bit of the stack pointer register indicates the second word size such that the width indication bit in the first stack save area in memory indicates that the data values for the procedure have the second word size.

10. The processor of claim 9, further comprising:

means for testing the width indication bit in the first stack save area in memory;

means for reading the data values and the least significant portion of the stack pointer value from the first stack save area, and storing the data values into the least significant portions of the registers and storing the least significant portion of the stack pointer value into the stack pointer register, and clearing the most significant bit of the stack pointer register to indicate that the data values for the procedure have the first word size if the width indication bit in the first stack save area in memory does not indicate that the data values for the procedure have the second word size;

means for reading the data values and the stack pointer value from the second stack save area, and storing the data values into the registers and storing the stack pointer value in the stack pointer register if the width indication bit in the first stack save area in memory indicates that the data values for the procedure have the second word size.

11. The processor of claim 10, wherein the width indication bit in the first stack save area comprises a least significant bit in a location of the first stack save area allocated to the stack pointer value for the procedure.

12. The processor of claim 10, wherein the first stack save area is specified by the stack pointer value in the stack pointer register.

13. The processor of claim 12, wherein the second stack save area is specified by the stack pointer value in the stack pointer register plus an offset value that corresponds to an area in memory required for the first stack save area.

14. The processor of claim 13, wherein the first word size comprises 32 bits and the second word size comprises 64 bits.

15. The processor of claim 14, wherein the registers in the processor and the stack pointer register in the processor comprise 16 registers each comprising 64 bits.

16. The processor of claim 15, wherein the offset value and the area in memory for the first stack save area each comprise 16 multiplied by 4 bytes per register.

* * * * *